US006858966B2

(12) United States Patent
Kondo et al.

(10) Patent No.: US 6,858,966 B2
(45) Date of Patent: Feb. 22, 2005

(54) SLIP RING APPARATUS FOR AN AUTOMOTIVE ALTERNATOR

(75) Inventors: Koji Kondo, Nishi Kasugai-gun (JP); Hiroaki Ishikawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/349,112

(22) Filed: Jan. 23, 2003

(65) Prior Publication Data

US 2003/0155835 A1 Aug. 21, 2003

(30) Foreign Application Priority Data

Feb. 15, 2002 (JP) ....................................... 2002-037923

(51) Int. Cl.[7] ................................................ H02R 39/08

(52) U.S. Cl. ....................... 310/232; 310/147; 310/135; 310/233

(58) Field of Search ................................ 310/232, 147, 310/135, 233

(56) References Cited

U.S. PATENT DOCUMENTS 3,185,878 A 5/1965 Reisnecker
4,346,321 A * 8/1982 Frister ........................ 310/232
4,535,264 A 8/1985 Allport
4,684,179 A 8/1987 Freeman
5,521,450 A * 5/1996 Rondier ...................... 310/232
5,612,584 A * 3/1997 York .......................... 310/232

FOREIGN PATENT DOCUMENTS

JP A 7-220843 8/1995
JP B2 2831416 9/1998

* cited by examiner

*Primary Examiner*—Dang Le
*Assistant Examiner*—Iraj A. Mohandesi
(74) *Attorney, Agent, or Firm*—Oliff & Berridge, PLC

(57) ABSTRACT

A slip ring apparatus includes a pair of slip rings electrically insulated from each other and disposed coaxially, a pair of electric conductive elements for providing electric connection between the pair of slip rings and a field coil of an automotive alternator, and an insulating member for holding the pair of slip rings and the pair of electric conductive elements. The electric conductive elements have at least one deformation absorbing portion for absorbing a deformation of the electric conductive elements.

17 Claims, 9 Drawing Sheets

SLIP RING APPARATUS FOR AN AUTOMOTIVE ALTERNATOR

BACKGROUND OF THE INVENTION

This invention relates to a slip ring apparatus for an automotive alternator (i.e., alternating-current generator) installed in an engine room of a passenger car, a truck, or other automotive vehicles.

Conventionally, the automotive alternators are roughly classified into a first type which includes a slip ring directly formed at a protruding portion of a rotor shaft and a second type which includes an independent slip ring apparatus as a separate unit being press-fitted around the rotor shaft.

For example, FIG. 10 shows a conventional slip ring apparatus 101 serving as a separate unit. According to this slip ring apparatus 101, a first slip ring 111 and a second slip ring 112 are electrically insulated from each other and disposed coaxially with each other. The first slip ring 111 is connected via a first metallic lead 113 to one end of a field coil of the automotive alternator (positioned at the left side of the slip ring apparatus 101 although not shown in the drawing). The second slip ring 112 is connected via a second metallic lead 114 to the other end of the field coil of the automotive alternator. Both of the first metallic lead 113 and the second metallic lead 114 are insert molded in a resin or comparable insulating member 115.

The insulating member 115 includes a cylindrical body 115*a* with an outer cylindrical surface on which the slip rings 111 and 112 are fixed and an inner cylindrical surface 115*e* defining a hollow space. An annular terminal holding portion 115*b*, having a diameter greater than that of the cylindrical body 115*a*, is provided at the opposite side of the slip ring apparatus 101 far from the cylindrical body 115*a* on which the first and second slip rings 111 and 112 are provided. Two branch portions 115*c* and 115*d* are disposed in parallel with each other along the axis of the slip ring apparatus 101 (i.e., along the axis of the cylindrical body 115*a*) and are symmetrically opposed about an axial center of the slip ring apparatus 101. Each of the branch portions 115*c* and 115*d* extends straight in the axial direction so as to connect the cylindrical body 115*a* to the terminal holding portion 115*b*.

The first metallic lead 113 extends axially in the cylindrical body 115*a* from the first slip ring 111 and then, at the portion embedded in the branch portion 115*c*, extends straight along the axis of the slip ring apparatus 101 (i.e., along the axis of the cylindrical body 115*a*). Then, the first metallic lead 113 bends perpendicularly in or near a merging region where the branch portion 115*c* changes into the terminal holding portion 115*b*, and further extends radially outward in the terminal holding portion 115*b*. A terminal end 113*a* of the first metallic lead 113 protrudes out of the annular terminal holding portion 115*b* and is connected to the one end of the field coil of the automotive alternator.

The second metallic lead 114 extends axially in the cylindrical body 115*a* from the second slip ring 112 and then, at the portion embedded in the branch portion 115*d*, extends straight along the axis of the slip ring apparatus 101 (i.e., along the axis of the cylindrical body 115*a*). Then, the second metallic lead 114 bends perpendicularly in or near a merging region where the branch portion 115*d* changes into the terminal holding portion 115*b*, and further extends radially outward in the terminal holding portion 115*b*. A terminal end 114*a* of the second metallic lead 114 protrudes out of the annular terminal holding portion 115*b* and is connected to the other end of the field coil of the automotive alternator.

However, the above-described conventional slip ring apparatus is disadvantageous in that the metallic leads 113 and 114 possibly deform during its manufacturing processes.

More specifically, the metallic leads 113 and 114 electrically connecting the slip rings 111 and 112 to the field coil are made of a thin metallic plate or a thin metallic wire. In the manufacturing process, the metallic leads 113 and 114 connected to the slip rings 111 and 112 are integrally molded in the resin or comparable insulating member 115. There is the possibility that the metallic leads 113 and 114 may deform undesirably due to inaccurate size of the leads, or defective connection between the leads and the slip rings, or an external force applied on the leads.

If such deformed metallic leads are placed in the molding dies, the deformed metallic leads will not stay as designated and may also damage the molding dies.

According to the slip ring apparatus 101 shown in FIG. 10, the first metallic lead 113 provides an electrical path to the first slip ring 111 located far from the field coil and underlies (i.e., extends radially inside with respect to) the second slip ring 112 located relatively close to the field coil. Thus, the first metallic lead 113 is electrically isolated from the second slip ring 112.

However, when the first metallic lead 113 deforms as shown in FIG. 11, there is the possibility that first metallic lead 113 may contact with the second slip ring 112. If the electrical connection or contact between the first metallic lead 113 and the second slip ring 112 is kept during the insert molding process, it will cause electrical short circuit between the first metallic lead 113 and the second slip ring 112 when this manufactured slip ring apparatus 101 is practically used because the fist and second slip rings 111 and 112 are brought into different electric potentials.

When electric short circuit occurs between the first metallic lead 113 and the second slip ring 112, the electric power generation will stop or heat generation will occur due to insufficient electric conduction. In the worst case, the insulating member 115 may burn out. Even when the first metallic lead 113 is covered by an insulating film, bringing the first metallic lead 113 into contact with the second slip ring 112 will possibly cause a damage of the insulating film. Thus, similar problem will arise.

If a non-destructive inspection using an X-ray or the like is performed to detect such a deformation of the first metallic lead 113 for each finished product of the slip ring apparatus, the second slip ring 112 (i.e., a metallic member surrounding the first metallic lead 113) will conceal the deformed portion of the first metallic lead 113 from the X-ray. Thus, using the non-destructive inspection is not substantially effective. This is the reason why the sampling inspection needs to be performed by a worker who randomly picks up a finished product, although relying on the sampling inspection cannot assure a stable manufacturing of high-quality slip ring apparatus.

SUMMARY OF THE INVENTION

In view of the above-described problems of the prior art, the present invention has an object to provide a slip ring apparatus for an automotive alternator which is capable of surely absorbing any deformation of the metallic leads and always positioning the metallic leads as designated.

In order to accomplish the above and other related objects, the present invention provides a slip ring apparatus for an automotive alternator, including a pair of slip rings electrically insulated from each other and disposed coaxially, a pair of electric conductive elements for providing electric connection between the pair of slip rings and a field coil of the automotive alternator, and an insulating member for holding the pair of slip rings and the pair of electric conductive elements. And, the electric conductive elements have at least one deformation absorbing portion for absorbing a deformation of the electric conductive elements.

According to this slip ring apparatus, the deformation absorbing portion absorbs any deformation occurring in the electric conductive elements. In other words, the electric conductive portion can be accurately positioned and appropriately insulated from a portion having a different electric potential. Furthermore, when the electric conductive element is covered with an insulating film, the deformation absorbing portion prevents the insulating film from being damaged by a sharp edge of a metallic member.

According to later-described embodiments of the present invention, it is preferable that the insulating member includes a cylindrical body for holding the pair of slip rings on an outer cylindrical surface thereof, a terminal holding portion from which terminal ends of the electric conductive elements protrude so as to be connected to the field coil. A pair of branch portions interposes between the cylindrical body and the terminal holding portion for holding the pair of electric conductive elements respectively. Thus, the electric conductive elements except for their terminal ends are embedded in the cylindrical body, the pair of branch portions, and the terminal holding portion. The deformation absorbing portion of the electric conductive elements is positioned in at least one of the branch portions.

It is further preferable that the deformation absorbing portion of the electric conductive elements is positioned in or near a merging region where the branch portions change into the cylindrical body.

It is further preferable that at least one of the electric conductive elements includes a hardened portion located in the cylindrical body.

It is further preferable that the deformation absorbing portion of the electric conductive elements is a bent portion being formed into a V-shaped or U-shaped configuration.

It is further preferable that the deformation absorbing portion of the electric conductive elements is a notch or cutout portion which is a thinned or weakened portion where the mechanical strength is locally reduced.

It is further preferable that the deformation absorbing portion of the electric conductive elements is a hole which is a weakened portion where the mechanical strength is locally reduced.

It is further preferable that the electric conductive elements are metallic wires.

It is further preferable that one electric conductive element is connected to one slip ring located far from the field coil compared with the other slip ring, and is disposed at a radially inner side of the other slip ring with an insulating gap provided between the electric conductive element and the other slip ring. And, the deformation absorbing portion is formed on this electric conductive element.

It is further preferable that the insulating member is an insert molded resin product integrated with the pair of slip rings and the pair of electric conductive elements.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
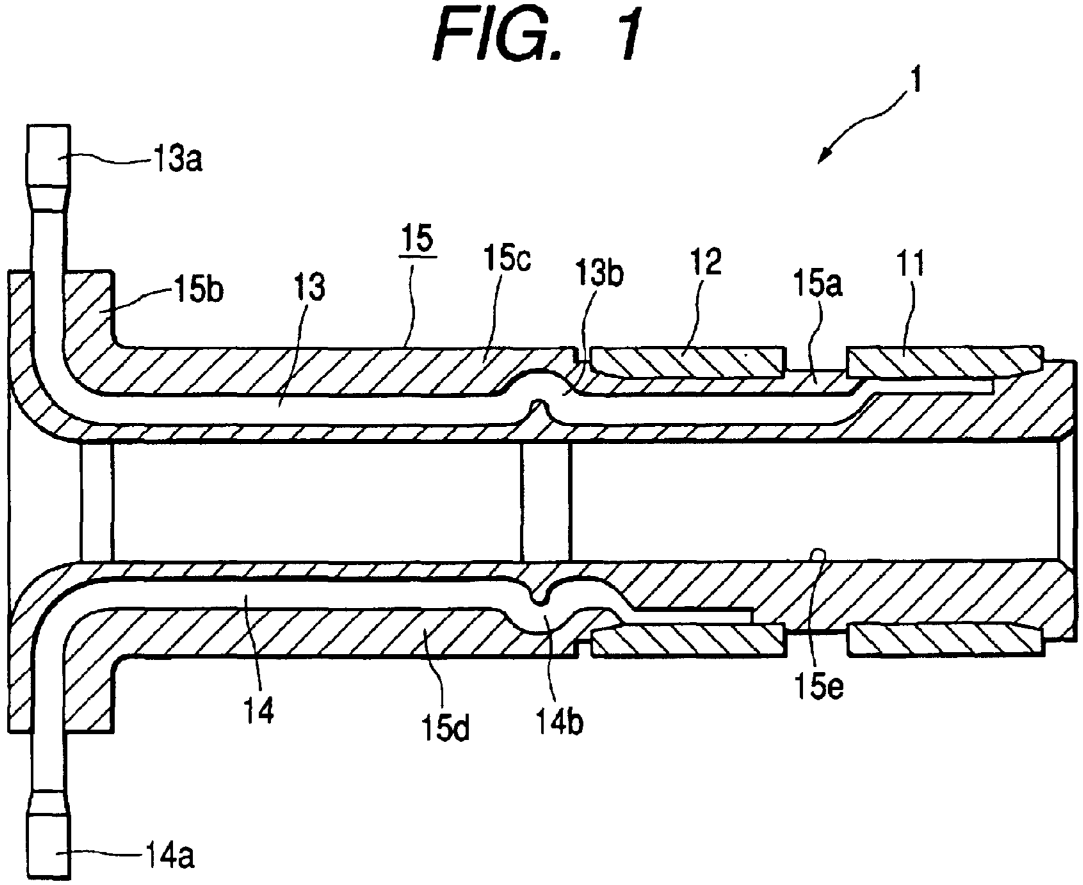
FIG. 1 is a cross-sectional view showing the arrangement of a slip ring apparatus for an alternator in accordance with a first embodiment of the present invention, taken along a plane including a center axis of the slip ring apparatus.

Preferred embodiments of the present invention will be explained hereinafter with reference to attached drawings. Identical parts are denoted by the same reference numerals throughout the drawings.

First, a slip ring apparatus in accordance with a first embodiment of the present invention will be explained with reference to FIGS. 1 to 5.

Figure 2:
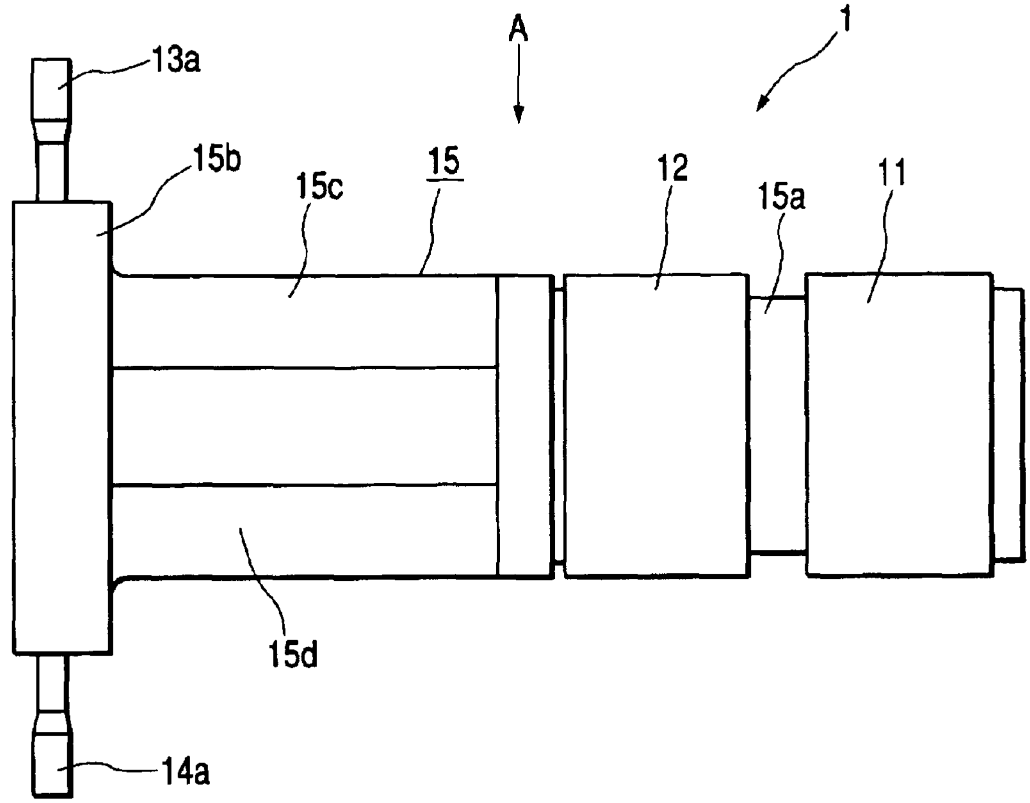
FIG. 2 is a side view showing the slip ring apparatus in accordance with the first embodiment of the present invention.
Figure 3:
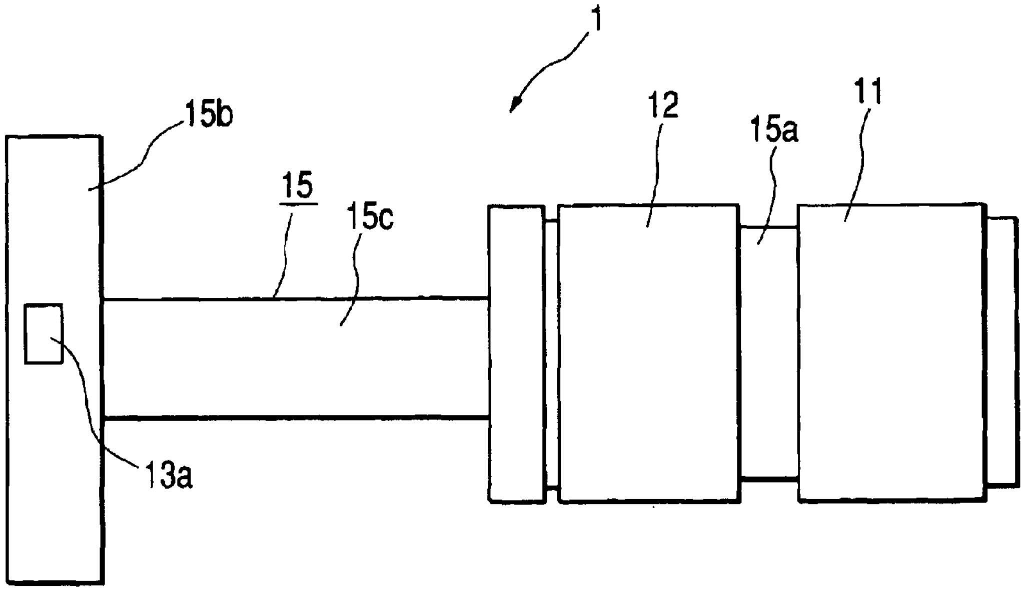
FIG. 3 is a side view of the slip ring apparatus shown in FIG. 2, seen from the direction of an arrow A shown in FIG. 2.

A slip ring apparatus 1, as shown in FIGS. 1 through 3, includes a first slip ring 11 and a second slip ring 12 which are electrically insulated from each other and disposed coaxially with each other. The first slip ring 11 is connected via a first metallic lead 13 to one end of a field coil 2 of the automotive alternator (positioned at the left side of the slip ring apparatus 1). The second slip ring 12 is connected via a second metallic lead 14 to the other end of the field coil 2 of the automotive alternator. Both of the first metallic lead 13 and the second metallic lead 14 are insert molded in a resin or comparable insulating member 15. The first metallic lead 13 and the second metallic lead 14 serve as a pair of electric conductive elements of the present invention.

The insulating member 15 includes a cylindrical body 15*a* formed at a distal end side of the slip ring apparatus 1 (i.e., the right side of FIG. 1). The cylindrical body 15*a* has an outer cylindrical surface on which the slip rings 11 and 12 are fixed and an inner cylindrical surface 15*e* defining a hollow space. An annular terminal holding portion 15*b*, having a diameter greater than that of the cylindrical body 15*a*, is formed at the opposite side (i.e., a proximal end side) of the slip ring apparatus 1 far from the cylindrical body 15*a* on which the first and second slip rings 11 and 12 are provided. Two, i.e., first and second, branch portions 15*c* and 15*d* are disposed in parallel with each other along the axis of the slip ring apparatus 1 (i.e., along the axis of the cylindrical body 15*a*) and are symmetrically opposed about an axial center of the slip ring apparatus 1 (refer to FIG. 2). Each of the first and second branch portions 15*c* and 15*d* extends straight in the axial direction so as to connect the cylindrical body 15*a* to the terminal holding portion 15*b*.

The first metallic lead 13 extends axially in the cylindrical body 15*a* from the first slip ring 11 and then, at the portion embedded in the first branch portion 15*c*, extends straight along the axis of the slip ring apparatus 1. Then, the first metallic lead 13 bends perpendicularly in or near a merging region where the first branch portion 15*c* changes into the terminal holding portion 15*b*, and further extends radially outward in the terminal holding portion 15*b*. A terminal end 13*a* of the first metallic lead 13 protrudes out of the annular terminal holding portion 15*b* and is connected to the one end of the field coil 2 of the automotive alternator.

The second metallic lead 14 extends axially in the cylindrical body 15*a* from the second slip ring 12 and then, at the portion embedded in the second branch portion 15*d*, extends straight along the axis of the slip ring apparatus 1. Then, the second metallic lead 14 bends perpendicularly in or near a merging region where the second branch portion 15*d* changes into the terminal holding portion 15*b*, and further extends radially outward in the terminal holding portion 15*b*. A terminal end 14*a* of the second metallic lead 14 protrudes out of the annular terminal holding portion 15*b* and is connected to the other end of the field coil 2 of the automotive alternator.

The cylindrical body 15*a*, the annular terminal holding portion 15*b*, and a pair of branch portions 15*c* and 15*d* are integrally insert molded by using a resin or comparable insulating material.

The first and second slip rings 11 and 12, coaxial with each other and positioned next to each other in the axial direction, are located at the distal end side of the slip ring apparatus 1 and accordingly located far from the field coil 2. The second slip ring 12 is positioned slightly closer to the field coil 2 compared with the first slip ring 11. The first and second slip rings 11 and 12 are electrically insulated from each other and are fixed on the outer cylindrical surface of the cylindrical body 15*a*.

The first metallic lead 13 is brazed or welded at one end (i.e., a right end) to the inner cylindrical surface of the first slip ring 11. The second metallic lead 14 is brazed or welded at one end (i.e., right end) to the inner cylindrical surface of the second slip ring 12. The other end of the first metallic lead 13, i.e., the terminal end 13*a*, is connected to one wiring terminal of the field coil 2. The other end of the second metallic lead 14, i.e., the terminal end 14*a*, is connected to the other wiring terminal of the field coil 2. The first metallic lead 13, connected to the first slip ring 11, is embedded in the insulating member 15 so as to successively extend in the cylindrical body 15*a*, the first branch portion 15*c*, and the annular terminal holding portion 15*b*. The first metallic lead 13 bends perpendicularly and extends radially outward in the annular terminal holding portion 15*b*, and its terminal end 13*a* protrudes out of the annular terminal holding portion 15*b*. The second metallic lead 14, connected to the second slip ring 12, is also embedded in the insulating member 15 so as to successively extend in the cylindrical body 15*a*, the second branch portion 15*d*, and the annular terminal holding portion 15*b*. The second metallic lead 14 bends perpendicularly toward the opposite direction and extends radially outward in the annular terminal holding portion 15*b*, and its terminal end 14*a* protrudes out of the annular terminal holding portion 15*b* in a direction opposed to the terminal end 13*a* of the first metallic lead 13.

The first and second metallic leads 13 and 14 are substantially straight in the portions embedded in the first and second branch portions 15*c* and 15*d*, except for the merging regions where the branch portions 15*c* and 15*d* change into the cylindrical body 15*a* or the vicinity thereof, respectively. Namely, the first metallic lead 13 has a bent portion 13*b* located in or near the merging region between the first branch portion 15*c* and the cylindrical body 15*a*. The second metallic lead 14 has a bent portion 14*b* located in or near the merging region between the second branch portion 15*d* and the cylindrical body 15*a*. The bent portions 13*b* and 14*b* are U-shaped or V-shaped portions configured within the thickness of the corresponding branch portions 15*c* and 15*d*.

The first metallic lead 13, extending from the first slip ring 11 toward the first branch portion 15*c*, underlies the second slip ring 12 and bends or deforms beforehand as the bent portion 13*b* at the predetermined portion beyond the second slip ring 12. The second metallic lead 14, extending from the second slip ring 12 toward the second branch portion 15*d*, bends or deforms beforehand as the bent portion 14*b* at an immediately next portion of the second slip ring 12.

The first metallic lead 13, connected to the first slip ring 11 which is located far from the field coil 2 compared with the second slip ring 12, is disposed radially inside the second slip ring 12 and electrically insulated from the second slip ring 12 with an appropriate gap because the first slip ring 11 and the second slip ring 12 are brought into different electric potentials when the slip ring apparatus 1 is practically used. The axial length of the first metallic lead 13 is longer than that of the second metallic lead 14 by an amount corresponding to an axial offset between the first slip ring 11 and the second slip ring 12. It will be preferable to coat or cover the entire surface of first metallic lead 13 with an insulating film if the clearance between the first metallic lead 13 and the second slip ring 12 is insufficient to assure sufficient insulation.

Figure 4:
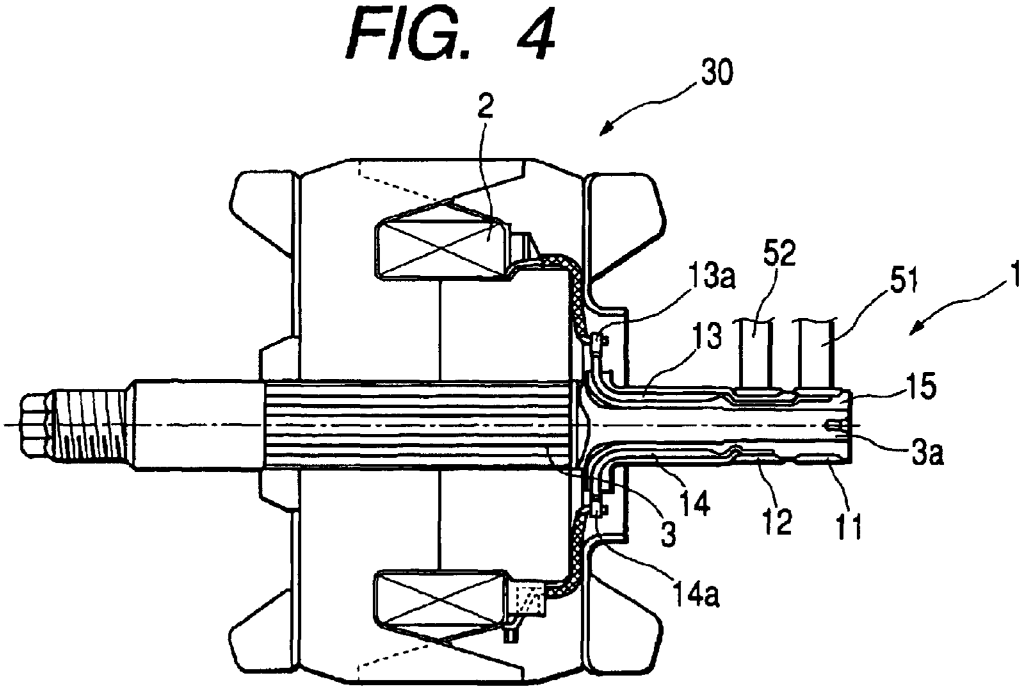
FIG. 4 is a cross-sectional view showing a rotor of the automotive alternator equipped with the slip ring apparatus in accordance with the first embodiment of the present invention.

The above-described slip ring apparatus 1 engages with or fits to a rotor shaft 3 of a rotor 30 as shown in FIG. 4. The annular terminal holding portion 15*b* locates beside the rotor shaft 3. The inner cylindrical surface 15*e* of the cylindrical body 15*a* is coupled or fitted around a protruding portion 3*a* of the rotor shaft 3. The protruding portion 3*a* of the rotor shaft 3 is coaxial with the main part of the rotor shaft 3. The protruding portion 3*a* of the rotor shaft 3 is inserted under pressure into the hollow space defined by the inner cylindrical surface 15*e*.

The first slip ring 11 is brought into contact with a brush 51. The second slip ring 12 is brought into contact with a brush 52. The terminal end 13*a* of the first metallic lead 13 and the terminal end 14*a* of the second metallic lead 14 are electrically conductive with the field coil 2. Thus, the electric path for supplying electric power to the field coil 2 is provided extensively from the brushes 51 and 52 to the field coil 2.

A method for manufacturing the above-described slip ring apparatus 1 will be explained hereinafter.

The method for manufacturing the slip ring apparatus 1 includes the following steps I through IV.

Step I: First, the first metallic lead 13 and the second metallic lead 14 are bonded (i.e., brazed, welded, or soldered) to axially offset portions on an inner cylindrical surface of a metallic sleeve. Although the metallic sleeve is a single element at this moment, the metallic sleeve is later cut or separated into two pieces so as to serve as the first slip ring 11 and the second slip ring 12.

Step II: Next, the metallic sleeve with the first and second metallic leads 13 and 14 bonded thereto is placed in a predetermined position between the molding dies.

Step III: The resin material is injected into the inside space defined by the engaged molding dies. A predetermined time has passed, the molding dies are released to leave the insulating member 15 integrally insert-molded with a pair of metallic leads 13 and 14 and a pair of slip rings 11 and 12.

Step IV: Then, the metallic sleeve is cut circumferentially at its axial center to remove an intermediate cylindrical zone having a predetermined axial width and leave the slip ring 11 and the slip ring 12 separated or isolated from each other. The slip ring apparatus 1 is thus accomplished.

Figure 10:
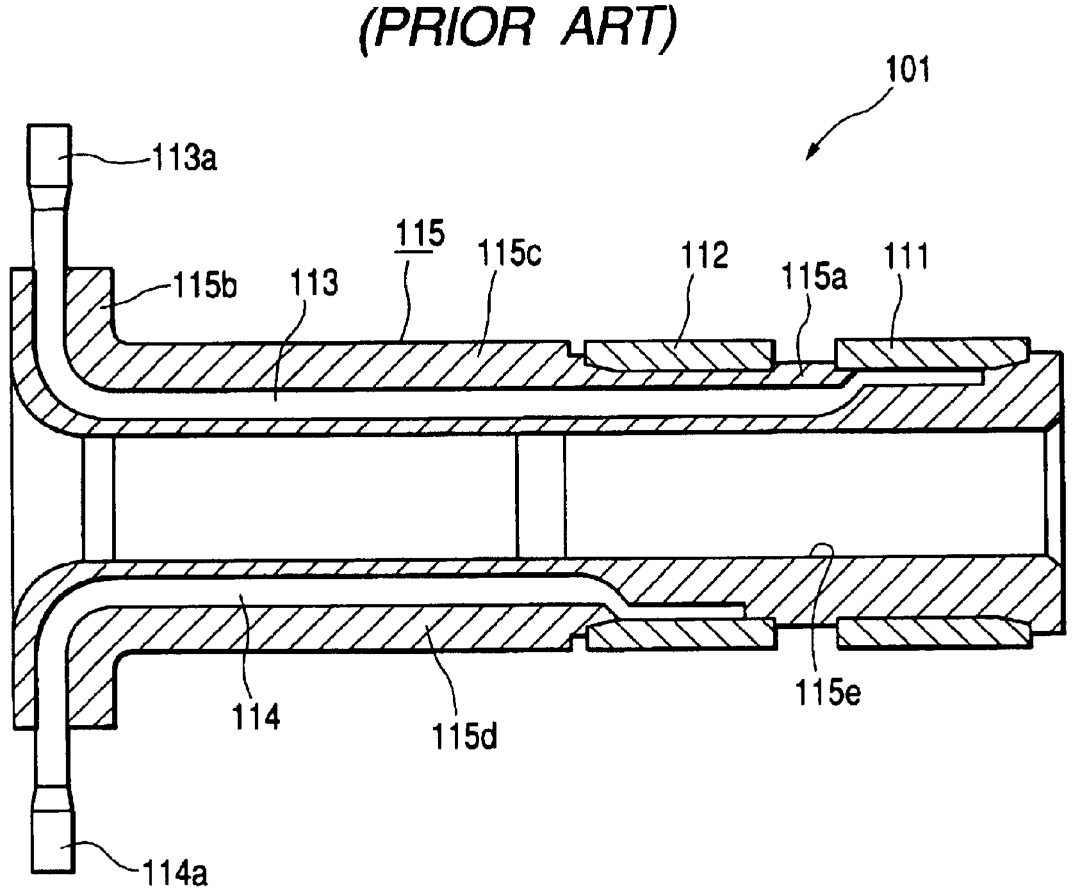
FIG. 10 (PRIOR ART)
FIG. 10 is a cross-sectional view showing the arrangement of a conventional slip ring apparatus, taken along a plane including a center axis of the slip ring apparatus.
Figure 11:
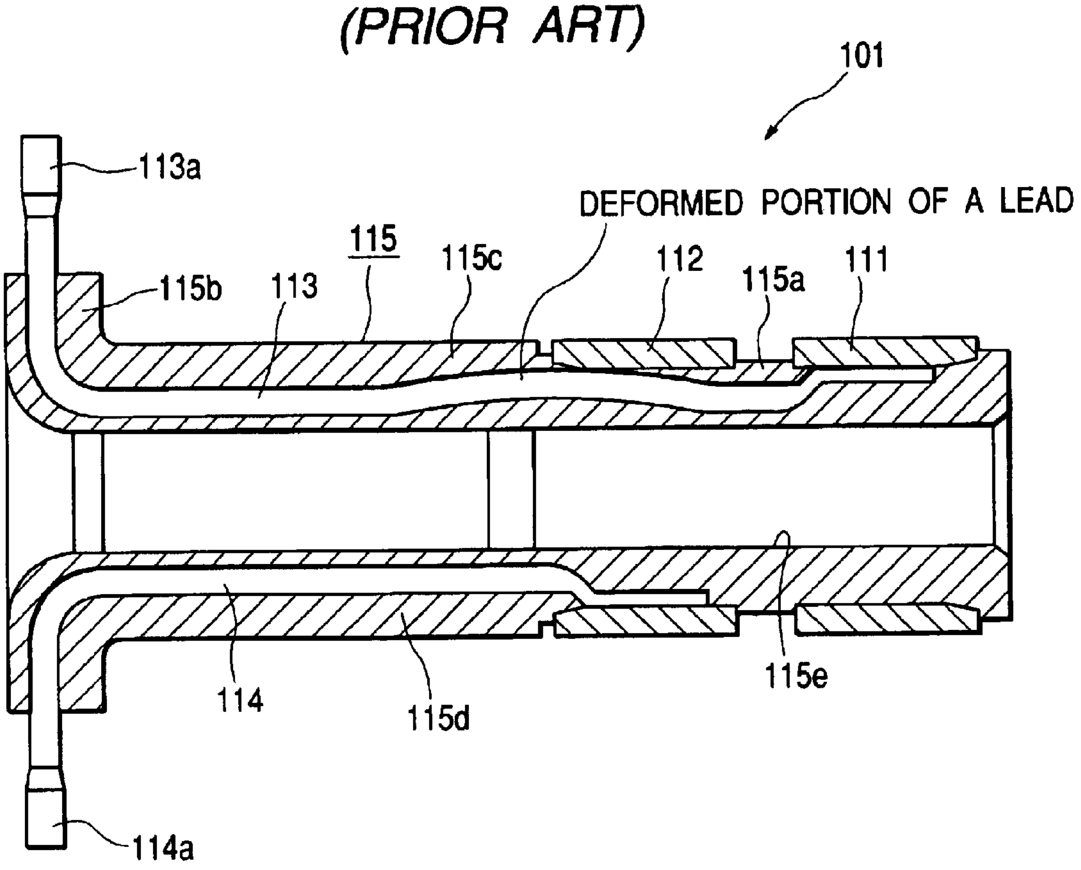
FIG. 11 (PRIOR ART)
FIG. 11 is a cross-sectional view explaining a deformed condition of a metallic lead in the conventional slip ring apparatus shown in FIG. 10.

According to the conventional slip ring apparatus 101 shown in FIG. 10, if the first metallic lead 113 deforms before or during the above manufacturing step II, the first metallic lead 113 may contact with the inner cylindrical surface of the second slip ring 112 as shown in FIG. 11.

Figure 5:
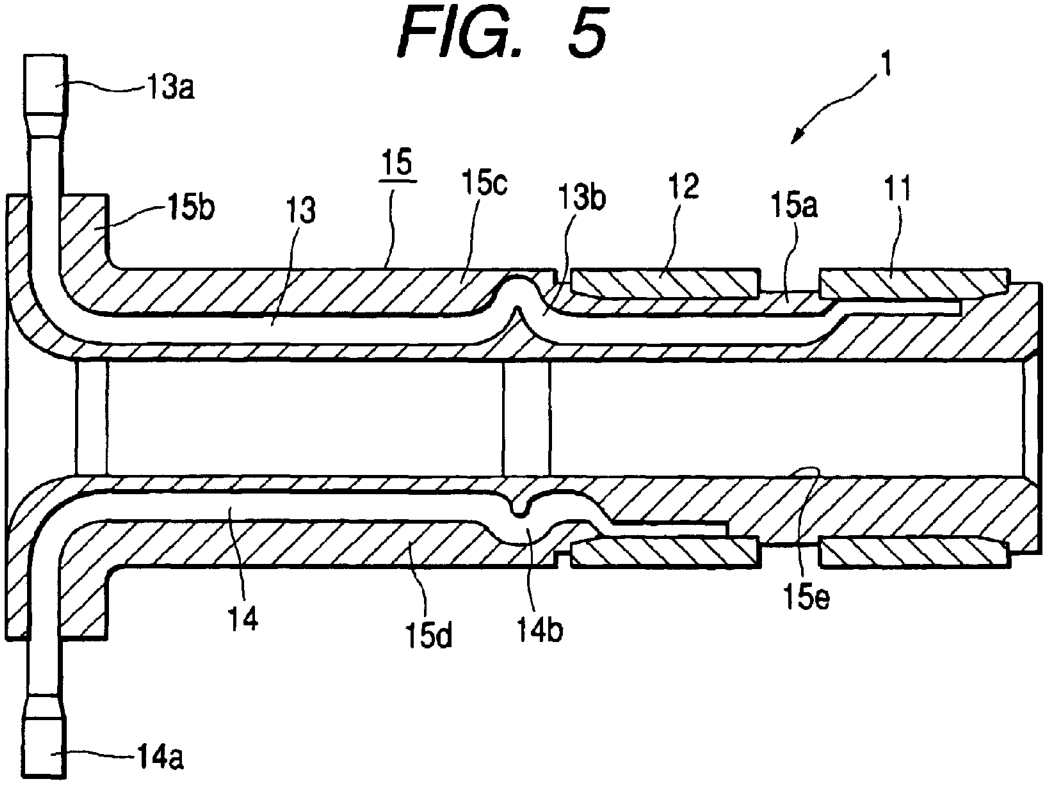
FIG. 5 is a cross-sectional view explaining a deformed condition of the metallic lead of the slip ring apparatus in accordance with the first embodiment of the present invention.

However, according to the slip ring apparatus 1 of this embodiment, even if the first metallic lead 13 deforms before or during the above manufacturing step II, the bent portion 13*b* absorbs such a deformation and maintains an appropriate gap between the first metallic lead 13 and the second slip ring 12 as shown in FIG. 5. In other words, the first metallic lead 13 is accurately positioned at a radially inner side of the second slip ring 12 with an appropriate insulating gap before and during the manufacturing step II, thereby assuring sufficient insulation between the first metallic lead 13 and the second slip ring 12. Thus, it becomes possible to surely prevent the first metallic lead 13 from contacting with the second slip ring 12 which have mutually different electric potentials. Regarding the second metallic lead 14, the bent portion 14*b* has the capability of absorbing the deformation if occurs in the second metallic lead 14. Thus, the second metallic lead 14 can be accurately positioned before or during the above manufacturing step II.

Figure 6A:
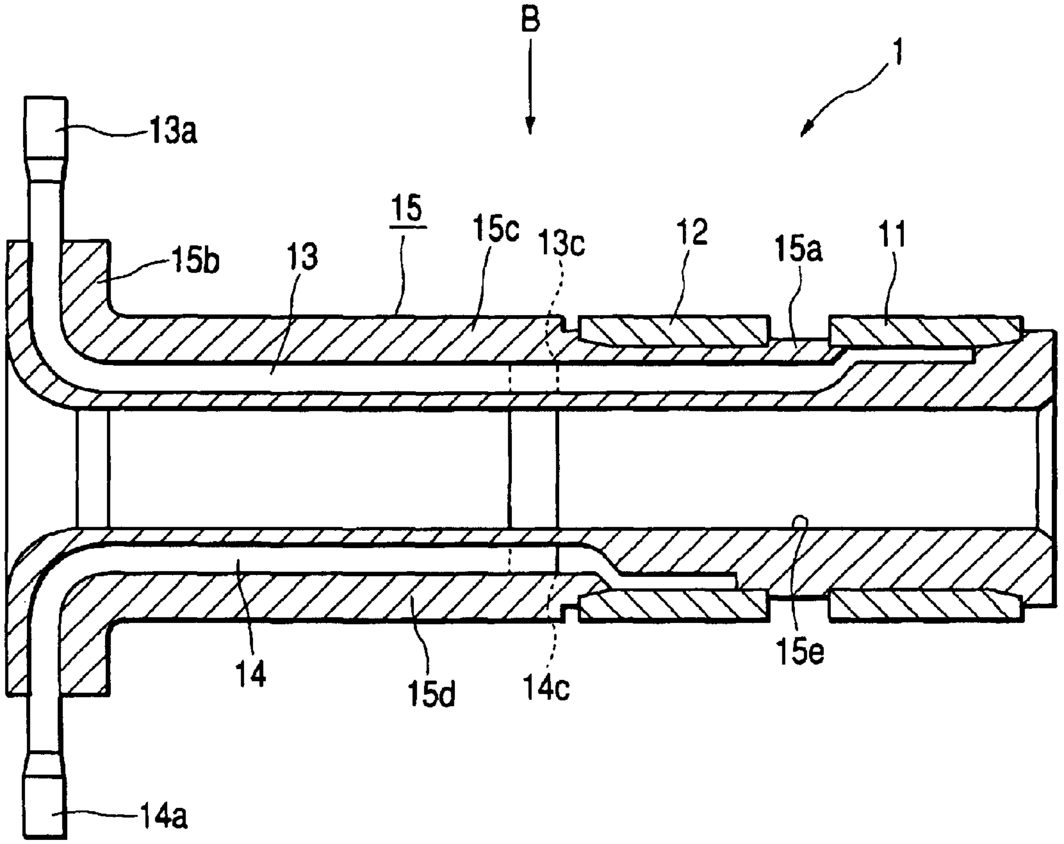
FIG. 6A is a cross-sectional view showing the arrangement of a slip ring apparatus for an alternator in accordance with a second embodiment of the present invention, taken along a plane including a center axis of the slip ring apparatus.
Figure 6B:
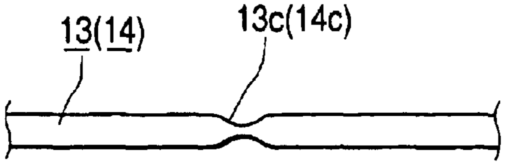
FIG. 6B is a side view showing the metallic lead of the slip ring apparatus shown in FIG. 6A, seen from the direction of an arrow B shown in FIG. 6A.

Next, a slip ring apparatus according to a second embodiment of the present invention will be explained with reference to FIGS. 6A and 6B.

The slip ring apparatus according to the second embodiment is different from the slip ring apparatus of the first embodiment in that the bent portions 13*b* and 14*b* are replaced by notch or cutout portions 13*c* and 14*c*.

The first and second metallic leads 13 and 14 of the second embodiment are substantially straight in the portions embedded in the first and second branch portions 15*c* and 15*d*, respectively. However, as clearly shown in FIG. 6B, the first and second metallic leads 13 and 14 have notch or cutout portions 13*c* and 14*c* located in or near the merging regions where the branch portions 15*c* and 15*d* change into the cylindrical body 15*a*. Namely, the notch or cutout portion 13*c* of first metallic lead 13 is located in or near the merging region between the first branch portion 15*c* and the cylindrical body 15*a*. The notch or cutout portion 14*c* of second metallic lead 14 is located in or near the merging region between the second branch portion 15*d* and the cylindrical body 15*a*. The notch or cutout portions 13*c* and 14*c* are narrow in width compared with the first and second metallic leads 13 and 14.

The first metallic lead 13, extending from the first slip ring 11 toward the first branch portion 15*c*, underlies the second slip ring 12 and shrinks partly as the notch or cutout portion 13*c* at the predetermined portion beyond the second slip ring 12. The second metallic lead 14, extending from the second slip ring 12 toward the second branch portion 15*d*, shrinks partly as the notch or cutout portion 14*c* at an immediately next portion of the second slip ring 12.

The notch or cutout portions 13*c* and 14*c* are thinned or weakened portions where the mechanical strength of respective metallic leads 13 and 14 is locally reduced. Thus, when an external force is applied on the metallic lead 13 or 14, the notch or cutout portion 13*c* or 14*c* easily deforms and accordingly absorbs any deformation occurring in the metallic lead 13 or 14. In other words, the first metallic lead 13 is accurately positioned at a radially inner side of the second slip ring 12 with an appropriate insulating gap provided between them. Therefore, the notch or cutout portions 13*c* and 14*c* of the second embodiment bring substantially the same effects as those of the bent portions 13*b* and 14*b* of the first embodiment.

Figure 7A:
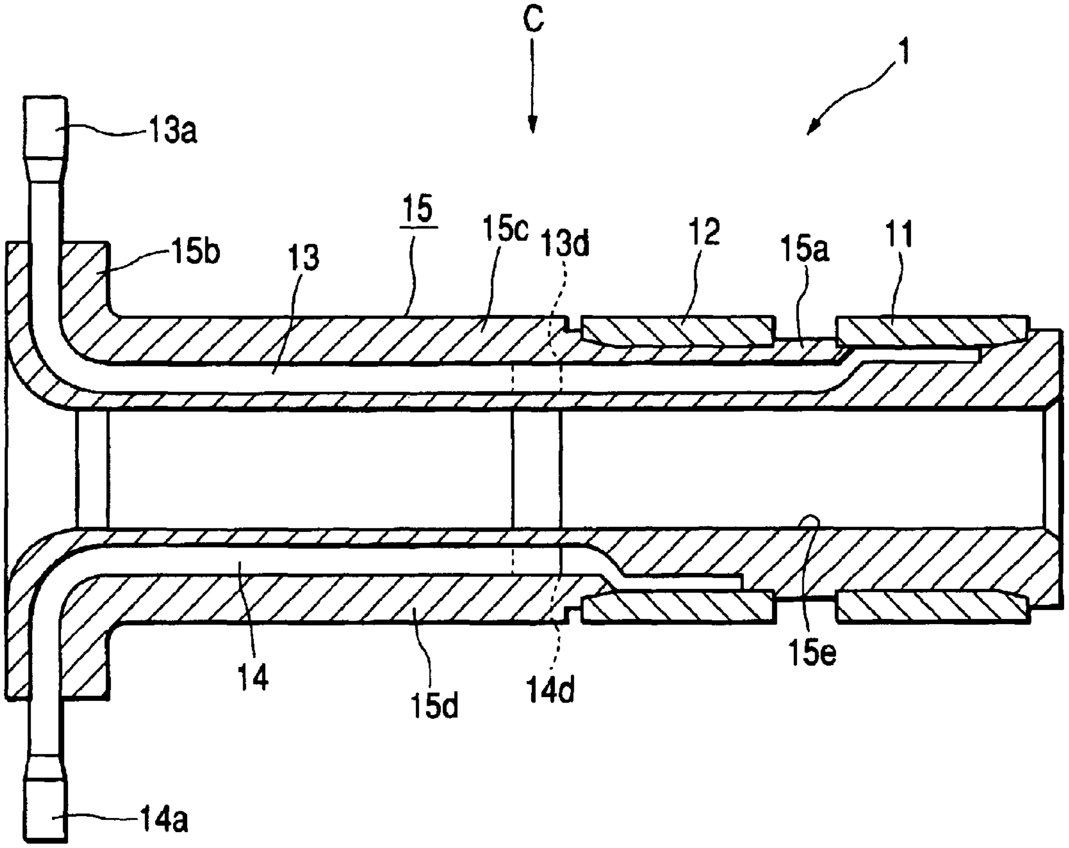
FIG. 7A is a cross-sectional view showing the arrangement of a slip ring apparatus for an alternator in accordance with a third embodiment of the present invention, taken along a plane including a center axis of the slip ring apparatus.
Figure 7B:
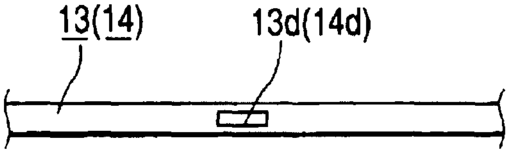
FIG. 7B is a side view showing the metallic lead of the slip ring apparatus shown in FIG. 7A, seen from the direction of an arrow C shown in FIG. 7A.

Next, a slip ring apparatus according to a third embodiment of the present invention will be explained with reference to FIGS. 7A and 7B.

The slip ring apparatus according to the third embodiment is different from the slip ring apparatus of the first embodiment in that the bent portions 13*b* and 14*b* are replaced by holes 13*d* and 14*d*.

The first and second metallic leads 13 and 14 of the third embodiment are substantially straight in the portions embedded in the first and second branch portions 15*c* and 15*d*, respectively. However, as clearly shown in FIG. 7B, the first and second metallic leads 13 and 14 have holes 13*d* and 14*d* located in or near the merging regions where the branch portions 15*c* and 15*d* change into the cylindrical body 15*a*. Namely, the hole 13*d* of first metallic lead 13 is located in or near the merging region between the first branch portion 15*c* and the cylindrical body 15*a*. The hole 14*d* of second metallic lead 14 is located in or near the merging region between the second branch portion 15*d* and the cylindrical body 15*a*.

The holes 13*d* and 14*d* are weakened portions where the mechanical strength of respective metallic leads 13 and 14 is locally reduced. Thus, when an external force is applied on the metallic lead 13 or 14, the metallic lead 13 or 14 easily deforms at the portion where the hole 13*d* or 14*d* is provided and accordingly absorbs any deformation occurring in the metallic lead 13 or 14. Therefore, the holes 13*d* and 14*d* of the third embodiment bring substantially the same effects as those of the bent portions 13*b* and 14*b* of the first embodiment.

Figure 8:
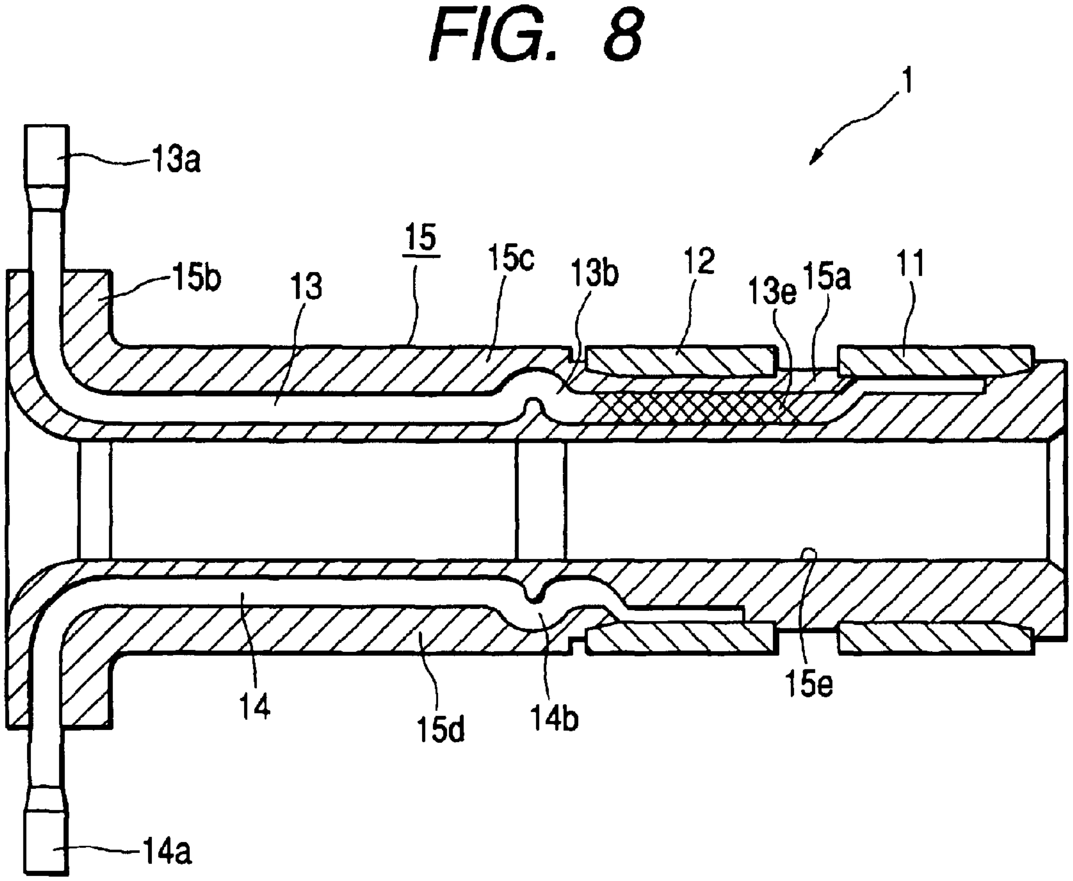
FIG. 8 is a cross-sectional view showing the arrangement of a slip ring apparatus for an alternator in accordance with a fourth embodiment of the present invention, taken along a plane including a center axis of the slip ring apparatus.

Next, a slip ring apparatus according to a fourth embodiment of the present invention will be explained with reference to FIG. 8.

The slip ring apparatus according to the fourth embodiment is different from the slip ring apparatus of the first embodiment in that a hardening or curing treatment is applied to a predetermined portion of the first metallic lead 13. More specifically, the first metallic lead 13 includes a hardened portion 13*e* (i.e., a netted region in FIG. 8) formed within the region of the cylindrical body 15*a*. The hardened portion 13*e* is the predetermined portion of the first metallic lead 13 where the plastic processing or heat treatment is applied exclusively. The hardened portion 13*e* has the mechanical strength higher than that of the remaining part of the first metallic lead 13. Thus, the hardened portion 13*e* has higher rigidity or durability against an applied external force. The hardened portion 13*e* is located at a radially inner side of the second slip ring 12, with an appropriate insulating gap provided between the first metallic lead 13 and the second slip ring 12 which have mutually different electric potentials.

According to the forth embodiment of the present invention, the first metallic lead 13 can be correctly positioned with respect to the second slip ring 12 due to synergistic effects of the bent portions 13*b* and 14*b* and the hardened portion 13*e*. Although not shown in FIG. 8, it is also preferable that a hardening or curing treatment is applied to a predetermined portion of the second metallic lead 14 within the region of the cylindrical body 15*a*.

The present invention is not limited to the above-described embodiments and, therefore, can be modified in various ways within the scope of the present invention.

For example, the above-described embodiments disclose the deformation absorbing portions, i.e., the bent portions, the notch or cutout portions, and the holes, which are formed on both of the first and second metallic leads 13 and 14. However, it is possible to provide only one deformation absorbing portion on the first metallic lead 13 considering a higher possibility of electric short circuit caused in the first metallic lead 13 due to the complicated arrangement of the first metallic lead 13 which underlies (i.e., extends radially inside with respect to) the second slip ring 12 having a different electric potential. Furthermore, it is possible to provide two or more deformation absorbing portions on each metallic lead. It is also possible to arbitrarily combine two or more different types of deformation absorbing portions selected from the group consisting of the above-described bent portions, the notch or cutout portions, and the holes.

Furthermore, the above-described embodiments show the deformation absorbing portions which are positioned in or near the merging regions where the branch portions 15*c* and 15*d* change into the cylindrical body 15*a*. However, it is possible to provide the deformation absorbing portions at any other regions in the branch portions 15*c* and 15*d* or in the annular terminal holding portion 15*b*.

The merit of providing the deformation absorbing portions in or near the merging regions where the branch portions 15*c* and 15*d* change into the cylindrical body 15*a* is that all of deformations occurring in the branch portions 15*c* and 15*d* as well as in the annular terminal holding portion 15*b* can be surely absorbed by the deformation absorbing portions before it reaches the cylindrical body 15*a*. Thus, even when undesirable deformations occur in the branch portions 15*c* and 15*d* or in the annular terminal holding portion 15*b*, no adverse influence is transmitted to the metallic lead portions located in the cylindrical body 15*a*.

Furthermore, according to the above-described embodiments, the first and second metallic leads 13 and 14 are bare wires. However, it is possible to use a metallic wire whose outer surface is entirely coated with an insulating film because it will not be damaged by the second slip ring 12 and its insulation property will be surely kept during the manufacturing processes according to the present invention. Furthermore, the first and second metallic leads 13 and 14 are not limited to metallic wires and therefore can be constituted as metallic plates. Using the metallic wires brings the advantages such that the yield of the manufactured leads is high and accordingly the manufacturing cost is low.

Figure 9:
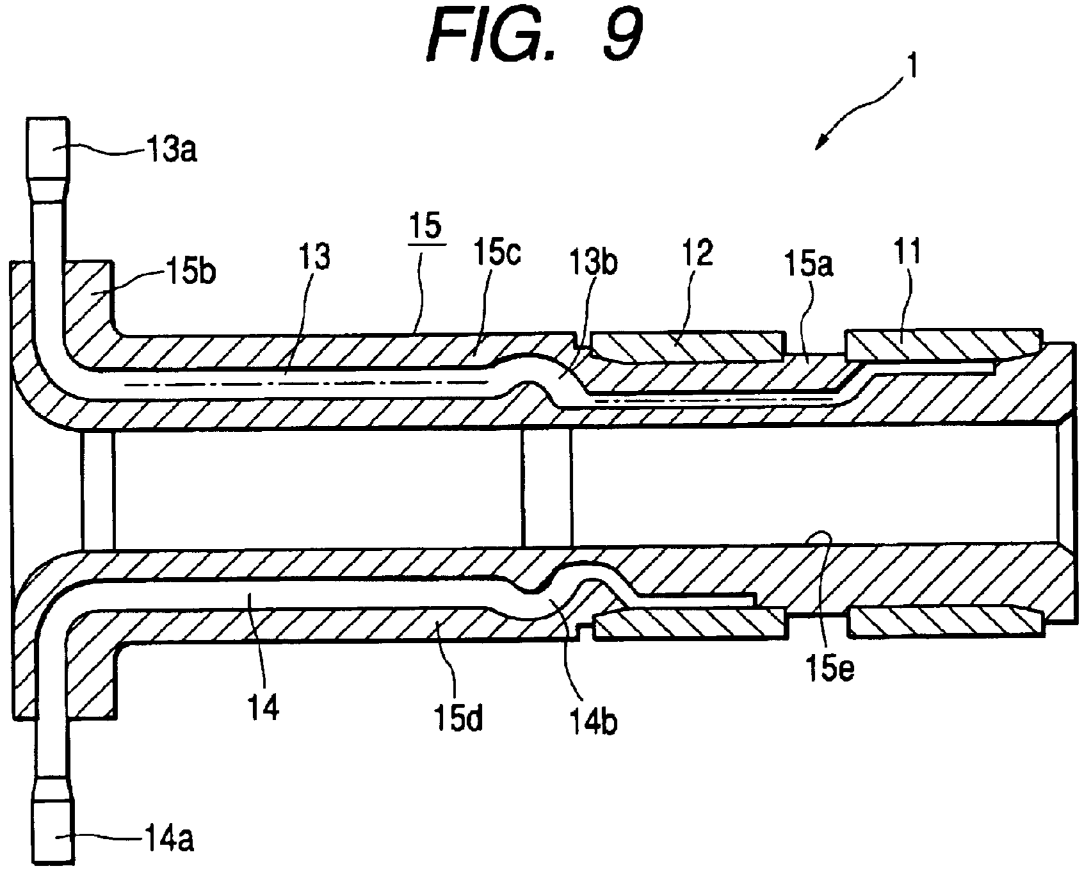
FIG. 9 is a cross-sectional view showing the arrangement of a modified slip ring apparatus for an alternator in accordance with the first embodiment of the present invention, taken along a plane including a center axis of the slip ring apparatus.

Furthermore, according to the above-described embodiments, the first and second metallic leads 13 and 14 align straight along the axis of the slip ring apparatus 1 in the cylindrical body 15*a* as well as in the branch portions 15*c* and 15*d*. However, as shown in FIG. 9, the metallic lead portion in the cylindrical portion 15*a* can be radially offset with respect to the metallic lead portion in the branch portion 15*c* or 15*d*. With this arrangement, it becomes possible to flexibly and easily change or modify the size and/or configuration of respective slip rings 11 and 12 and the insulating member 15. According to the arrangement shown in FIG. 9, the metallic leads in the cylindrical portion 15*a* are positioned at the radially inner side with respect to the metallic leads in the branch portion 15*c* or 15*d*.

As apparent from the foregoing description, the preferred embodiments of the present invention provide a slip ring apparatus for an automotive alternator, including a pair of slip rings (11, 12) electrically insulated from each other and disposed coaxially, a pair of electric conductive elements (13, 14) for providing electric connection between the pair of slip rings (11, 12) and a field coil (2) of the automotive alternator, and an insulating member (15) for holding the pair of slip rings (11, 12) and the pair of electric conductive elements (13, 14). And, the electric conductive elements (13, 14) have at least one deformation absorbing portion (13*b*, 14*b*; 13*c*, 14*c*; 13*d*, 14*d*) for absorbing a deformation of the electric conductive elements.

According to this slip ring apparatus, the deformation absorbing portion absorbs any deformation occurring in the electric conductive elements. In other words, the electric conductive portion (13) can be accurately positioned and appropriately insulated from a portion (12) having a different electric potential. Furthermore, when the electric conductive element is covered with an insulating film, the deformation absorbing portion can prevent the insulating film from being damaged by a sharp edge of a metallic member.

Preferably, the insulating member (15) includes a cylindrical body (15*a*) for holding the pair of slip rings (11, 12) on an outer cylindrical surface thereof, a terminal holding portion (15*b*) from which terminal ends (13*a*, 14*a*) of the electric conductive elements (13, 14) protrude so as to be connected to the field coil (2). A pair of branch portions (15*c*, 15*d*) interposes between the cylindrical body (15*a*) and the terminal holding portion (15*b*) for holding the pair of electric conductive elements (13, 14) respectively. Thus, the cylindrical body (15*a*), the pair of branch portions (15*c*, 15*d*), and the terminal holding portion (15*b*) cooperatively embed the pair of electric conductive elements (13, 14) except for the terminal ends (13*a*, 14*a*). The deformation absorbing portion (13*b*, 14*b*; 13*c*, 14*c*; 13*d*, 14*d*) of the electric conductive elements (13, 14) is positioned in at least one of the branch portions (15*c*, 15*d*).

According to this arrangement, any deformation occurring in the branch portions (15*c*, 15*d*) can be surely absorbed by the deformation absorbing portion. Thus, the electric conductive portion (13) can be accurately positioned and appropriately insulated from the portion (12) having a different electric potential. Furthermore, the deformation absorbing portion can prevent the insulating film covering the electric conductive element from being damaged by a sharp edge of a metallic member.

Preferably, the deformation absorbing portion (13*b*, 14*b*; 13*c*, 14*c*; 13*d*, 14*d*) of the electric conductive elements (13, 14) is positioned in or near a merging region where the branch portions (15*c*, 15*d*) change into the cylindrical body (15*a*).

According to this arrangement, all of deformations occurring in the branch portions (15*c*, 15*d*) as well as in the terminal holding portion (15*b*) can be surely absorbed by the deformation absorbing portion before it reaches the cylindrical body (15*a*). Thus, no adverse influence is transmitted to the electric conductive elements located in the cylindrical body (15*a*).

Preferably, at least one of the electric conductive elements (13, 14) includes a hardened portion (13*e*) located in the cylindrical body (15*a*).

According to this arrangement, the electric conductive element positioned in the cylindrical body has a higher rigidity. Thus, the electric conductive element (13) can be correctly positioned and adequately insulated from the portion (12) having a different electric potential due to synergistic effects of the bent portions (13*b*, 14*b*) and the hardened portion (13*e*).

Preferably, the deformation absorbing portion of the electric conductive elements (13, 14) is a bent portion (13*b*, 14*b*) being formed into a V-shaped or U-shaped configuration. The bent portion (13*b*, 14*b*) can be easily formed by partly bending a predetermined portion of the electric conductive element. The V-shaped or U-shaped configuration is effective to absorb the deformation of the electric conductive elements.

Preferably, the deformation absorbing portion of the electric conductive elements (13, 14) is a notch or cutout portion (13*c*, 14*c*) which is a thinned or weakened portion where the mechanical strength is locally reduced. The notch or cutout portion (13*c*, 14*c*) can be easily formed by partly removing a predetermined portion of the electric conductive element. The notch or cutout portion is effective to absorb the deformation of the electric conductive elements.

Preferably, the deformation absorbing portion of the electric conductive elements (13, 14) is a hole (13*d*, 14*d*) which is a weakened portion where the mechanical strength is locally reduced. The hole (13*d*, 14*d*) can be easily formed by partly opening a predetermined portion of the electric conductive element. The hole is effective to absorb the deformation of the electric conductive elements.

Preferably, the electric conductive elements (13, 14) are metallic wires. Using the metallic wires is advantageous in that the yield of the manufactured conductive elements is high and accordingly the manufacturing cost is low.

Preferably, one electric conductive element (13) is connected to one slip ring (11) located far from the field coil (2) compared with the other slip ring (12), and is disposed at a radially inner side of the other slip ring (12) with an insulating gap provided between the electric conductive element (13) and the other slip ring (12). And, the deformation absorbing portion (13*b*; 13*c*; 13*d*) is formed on this electric conductive element (13).

This arrangement surely prevents the electric conductive element (13) from contacting the inner cylindrical surface of the slip ring (12).

Preferably, the insulating member (15) is an insert molded resin product integrated with the pair of slip rings (11, 12) and the pair of electric conductive elements (13, 14).

According to this arrangement, the deformation absorbing portion surely absorbs the deformation of the electric conductive elements (13, 14) during the process of insert molding the insulating member (15).

What is claimed is:

1. A slip ring apparatus for an automotive alternator, comprising, a pair of slip rings electrically insulated from each other and disposed coaxially;

a pair of electric conductive elements for providing electric connection between said pair of slip rings and a field coil of said automotive alternator; and an insulating member for holding said pair of slip rings and said pair of electric conductive elements, wherein said pair of electric conductive elements have at least one deformation absorbing portion for absorbing a deformation of said pair of electric conductive elements, one electric conductive element is connected to one slip ring located far from said field coil compared with the other slip ring, and is disposed at a radially inner side of said other slip ring with an insulating gap provided between said one electric conductive element and said other slip ring, and said at least one deformation absorbing portion is formed on said one electric conductive element.

2. The slip ring apparatus for an automotive alternator according to claim 1, wherein said insulating member comprises a cylindrical body for holding said pair of slip rings on an outer cylindrical surface thereof, a terminal holding portion from which terminal ends of said electric conductive elements protrude so as to be connected to said field coil, and a pair of branch portions interposing between said cylindrical body and said terminal holding portion for holding said pair of electric conductive elements respectively, in such a manner that said cylindrical body, said pair of branch portions, and said terminal holding portion cooperatively embed said pair of electric conductive elements except for said terminal ends, and said at least one deformation absorbing portion of said electric conductive elements is positioned in at least one of said branch portions.

3. The slip ring apparatus for an automotive alternator according to claim 2, wherein said at least one deformation absorbing portion of said electric conductive elements is positioned in or near a merging region where said branch portions change into said cylindrical body.

4. The slip ring apparatus for an automotive alternator according to claim 2, wherein at least one of said pair of electric conductive elements comprises a hardened portion located in said cylindrical body.

5. The slip ring apparatus for an automotive alternator according to claim 1, wherein said at least one deformation absorbing portion of said electric conductive elements is a bent portion being formed into a V-shaped or U-shaped configuration.

6. The slip ring apparatus for an automotive alternator according to claim 1, wherein said at least one deformation absorbing portion of said electric conductive elements is a notch or cutout portion which is a thinned or weakened portion where the mechanical strength is locally reduced.

7. The slip ring apparatus for an automotive alternator according to claim 1, wherein said at least one deformation absorbing portion of said electric conductive elements is a hole which is a weakened portion where the mechanical strength is locally reduced.

8. The slip ring apparatus for an automotive alternator according to claim 1, wherein said electric conductive elements are metallic wires.

9. The slip ring apparatus for an automotive alternator according to claim 1, wherein said insulating member is an insert molded resin product integrated with said pair of slip rings and said pair of electric conductive elements.

10. A slip ring apparatus for an automotive alternator, comprising:

a pair of slip rings electrically insulated from each other and disposed coaxially;

a pair of electric conductive elements for providing electric connection between said pair of slip rings and a field coil of said automotive alternator; and an insulating member for holding said pair of slip rings and said pair of electric conductive elements, wherein said pair of electric conductive elements have at least one deformation absorbing portion for absorbing a deformation of said pair of electric conductive elements, said insulating member comprises a cylindrical body for holding said pair of slip rings on an outer cylindrical surface thereof, a terminal holding portion from which terminal ends of said electric conductive elements protrude so as to be connected to said field coil, and a pair of branch portions interposing between said cylindrical body and said terminal holding portion for holding said pair of electric conductive elements respectively, in such a manner that said cylindrical body, said pair of branch portions, and said terminal holding portion cooperatively embed said pair of electric conductive elements except for said terminal ends, and said at least one deformation absorbing portion of said electric conductive elements is positioned in at least one of said branch portions.

11. The slip ring apparatus for an automotive alternator according to claim 10, wherein said at least one deformation absorbing portion of said electric conductive elements is positioned in at least one of in a merging region and near a merging region where said branch portions change into said cylindrical body.

12. The slip ring apparatus for an automotive alternator according to claim 10, wherein at least one of said pair of electric conductive elements comprises a hardened portion located in said cylindrical body.

13. The slip ring apparatus for an automotive alternator according to claim 10, wherein said at least one deformation absorbing portion of said electric conductive elements is a bent portion being formed into one of a V-shaped and a U-shaped configuration.

14. The slip ring apparatus for an automotive alternator according to claim 10, wherein said at least one deformation absorbing portion of said electric conductive elements is one of a notch and a cutout portion which is at least one of a thinned portion and a weakened portion where the mechanical strength is locally reduced.

15. The slip ring apparatus for an automotive alternator according to claim 10, wherein said at least one deformation absorbing portion of said electric conductive elements is a hole which is a weakened portion where the mechanical strength is locally reduced.

16. The slip ring apparatus for an automotive alternator according to claim 10, wherein said electric conductive elements are metallic wires.

17. The slip ring apparatus for an automotive alternator according to claim 10, wherein said insulating member is an insert molded resin product integrated with said pair of slip rings and said pair of electric conductive elements.

* * * * *